LEAD ASSEMBLY

Filed Dec. 27, 1966

Inventor
William H. Watkins

By Joseph A. Seminomi
Attorney

United States Patent Office 3,441,759

Patented Apr. 29, 1969

3,441,759
LEAD ASSEMBLY

William H. Watkins, Jacksonville, Ark., assignor to Controls Company of America, Melrose Park, Ill., a corporation of Delaware Filed Dec. 27, 1966, Ser. No. 604,953
Int. Cl. H02k *11/00*
U.S. Cl. 310—71 9 Claims This invention relates to the assembly of leads in electrical apparatus and, more particularly, to the assembly of leads in dynamoelectric machines.

Specifically, this invention is concerned with the problem of assembling the leads of an electric motor or the like. This is usually a manual assembly task and is a particularly significant problem in the assembly of relatively small motors, but it is also a problem in larger motors. For example, the terminal lead portions, or coil ends, of the field coils of a wound stator must be positively held in place in the coil channels with adequate spacing therebetween and, in addition, at least some measure of strain relief must be provided for the terminal lead portions. In the past, assemblies which met one or more of these requirements have relied on either lacing the leads, using a suitable wedge, or anchoring the leads in place using a suitable coating of electrical insulating material. For one or more reasons, none of these approaches offered a completely adequate solution to the problem. These approaches either did not maintain adequate lead spacing, could not provide adequate strain relief, required an assembly process which could not be automated, interfered with the flow of cooling air through the coil structure, and/or, in the case of a wedge, offered no control over the force exerted on the terminal lead portions so as to insure uniformity in connections.

An object of this invention is to provide an improved and simplified method of assembling leads in electrical apparatus such as a dynamoelectric machine.

A further object of this invention is to provide an improved and simplified arrangement and method of assembling leads in an electric motor which fixes the leads and holds them in spaced relationship while also providing controllable strain relief for the leads.

A more specific object of this invention is to accomplish the aforementioned objects in an electric motor without interfering with the flow of cooling air through the motor.

A still further, more specific object of this invention is to provide a method of attachment of leads which is adaptable to automated procedures and affords repeatable connection characteristics.

For the achievement of these and other objects, this invention proposes to provide a holding member between adjacent electrical leads. The holding member is characterized by having a normal configuration and a tendency to return to its normal configuration when it has been deformed therefrom. The holding member is placed between the leads in the deformed configuration and the force produced by its tendency to return to its normal configuration is used to maintain the leads in spaced relationship and also to wedge the leads in their lead channel. Preferably, the holding member is in the form of a strip which is coiled in a spiral about an elongated axis. The coiled holding member is placed in a lead channel with its outer periphery in engagement with adjacent leads. The coiled member, in tending to return to its normal configuration, attempts to expand in a radially outward direction urging the leads away from each other. This holds a spacing between the leads but also, with the leads confined in the lead channel, wedges the leads in position in that channel so as to resist an axial pull on the leads. By utilizing an elongated holding member the amount of engagement between the holding member and the leads can be varied as desired to vary the wedging force on the leads and correspondingly the magnitude of the axial pull which can be resisted, in other words a controllable strain relief connection is provided for the leads. Furthermore, the spiral configuration attributes a generally hollow character to the holding member so that it does not interfere with air flow through the motor, specifically through the winding structure.

Other objects and advantages will be pointed out in, or be apparent from, the specification and claims, as will obvious modifications of the embodiment shown in the drawings, in which:

Figure 4:
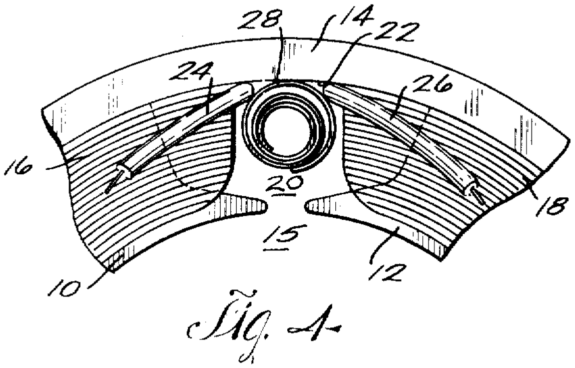
FIG. 4 is an end view of a portion of the motor structure illustrating the holding member in position in the lead channel.

With particular reference to the drawings, a portion of an electric motor stator is illustrated in FIG. 4. The stator is of conventional construction as is the remainder of the motor and, since a showing of only the coil structure and arrangement is necessary to an understanding of this invention, the complete motor has not been illustrated.

In accordance with conventional constructions, a pair of adjacent pole arms 10 and 12 extend radially inwardly from a cylindrical potrion 14 and define an opening 15 for receipt of an armature (not shown). Portion 14 provides a connecting metallic path between adjacent poles and functions as a port of the magnetic circuit for the motor field. Coils 16 and 18 are wound on pole arms 10 and 12 and have portions extending through coil or lead channel 20. The coil channel is defined by radially extending, opposed faces of the pole arms and inner wall 22 of portion 14.

Figure 1:
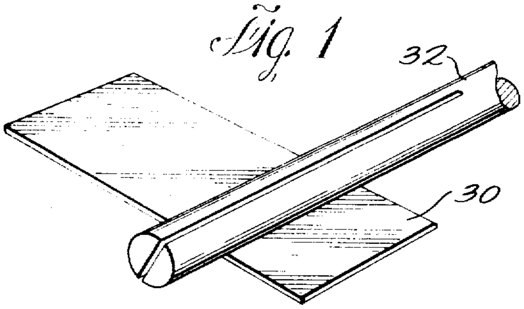
FIG. 1 is a plan view of the holding member in its normal configuration and in engagement with a suitable tool for deforming a holding member.
Figure 2:
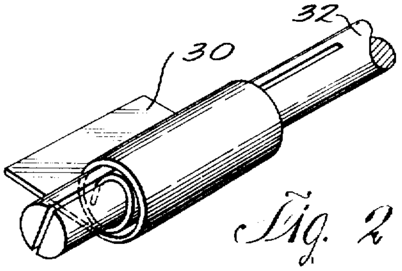
FIG. 2 illustrates the operation of deforming the holding member.
Figure 3:
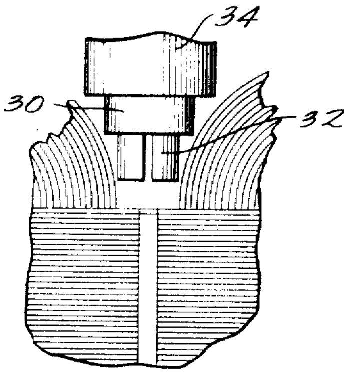
FIG. 3 illustrates the coiled holding member and tool positioned for insertion into a coil channel.

Terminal lead portions 24 and 26 of the coils extend into the lead channel and are generally lose after the winding operation. It is general practice to provide some manner of fixing the leads in the coil channel. In accordance with this invention a spiral holding member 28 is positioned in the lead channel and provides the medium which holds the terminal lead portions in the lead channel and in relative spaced relationship. The holding member is formed by cutting an elongated strip 30 from material having suitable characteristics so that strip 30 will have a normal flat configuration and when deformed from that normal configuration exhibits a tendency to return to the normal configuration with sufficient force to provide a useable biasing force. A material which possesses the requisite characteristics and has provided adequate results is available under the commercial name Mylar. This material is purchased in sheets and can be cut in strips as illustrated in FIG. 1. The individual strips are assembled on a slotted tool 32 and coiled about the tool in the manner illustrated in FIG. 2. After the strip is completely coiled it remains on the tool and a sleeve 34 is placed over the outside of the coil. The sleeve prevents the strip returning to its flat configuration. In this form, the tool and coiled strip are positioned at the coil channel as illustrated in FIG. 3 and the tool and strip are moved to insert the strip axially into the coil channel and between the terminal lead portions. During insertion the coiled strip is removed from the sleeve and after the strip has been inserted in the coil channel the tool is disengaged from the strip and withdrawn. Since the strip is now free of both the tool and outer sleeve 32 it tends to relax and return toward its normal flat configuration. However, the spacing in the coil channel is insufficient to permit this expansion and the strip remains in a coiled spiral configuration and in engagement with terminal lead portions 24 and 26 as seen in FIG. 4. The strip exerts a continuous force between the lead terminal portions and in a direction urging the terminal lead portions away from each other to thereby maintain spacing therebetween. Furthermore, the holding member and terminal lead portions are arranged so that the latter is urged against inner wall 22 and the sides of their respective coils thereby achieve a wedging action on the leads.

Figure 5:
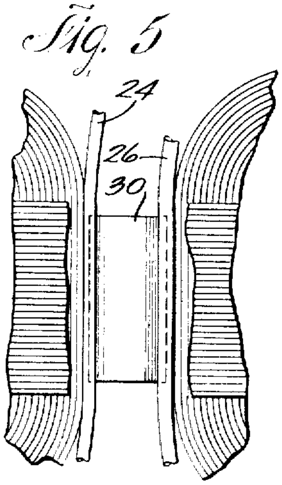
FIG. 5 is a plan view of the coil channel of FIG. 4 with portions of the pole pieces broken away to expose the coil channel and holding member.

This arrangement can be easily automated and will provide precise, predictable and repeatable characteristics even in volume motor production. The wedging action on the leads provides a measure of strain relief for the leads and a further advantage of this arrangement is that the force with which the leads are wedged against their respective coils and the inner wall of the lead channel is dependent upon the amount of contact between the leads and the spiral holding member, more particularly the axial length of the spiral holding member as illustrated in FIG. 5. In this manner the amount of strain relief provided can be readily adjusted by varying the axial length of the holding member. Furthermore, by using a relatively open spiral configuration the holding member provides adequate lead assembly without unduly obstructing the otherwise open areas provided between the coils for passage of cooling air.

After the assembly process is completed as illustrated in FIGS. 4 and 5 the interior coil channel can be coated with varnish or other suitable electrical insulating medium. The coating sets the assembly, positively locks the leads in place and contributes to the strain relief which is provided.

It will be appreciated that although a spiral configuration for the holding member in the coil channel is preferred as it provides optimum wedging force to insure positive holding of the leads, it is possible to deform the holding member from its normal configuration into other shapes and to maintain lead assembly by utilizing the force of that deformed configuration as it tends to return to its normal configuration. For example a tubular shape similar to the outer periphery of the holding member could be used. In this respect, however, a further advantage of the spiral configuration is that once inserted in the lead channel tool 32 can be reinserted at any time to turn the spiral and increase the wedging force if required. For example, to facilitate connection it may be necessary to manipulate the terminal lead portions after the spiral holding member has been inserted. This can be accomplished and the tool reinserted and the spiral turned in a direction to expand the spiral to re-establish the requisite wedging action.

Although but one embodiment of the present invention has been illustrated and described, it will be apparent to those skilled in the art that various changes and modifications may be made therein without departing from the spirit of the invention or from the scope of the appended claims.

I claim:

1. In a dynamoelectric machine,
means defining a winding channel,
first and second electrical windings each terminating in a terminal lead portion extending into said channel, said terminal lead portions arranged in relative spaced relationship in said channel,
holding means in said channel between said terminal lead portions and holding said terminal lead portions in spaced relation, said holding means characterized by having a normal configuration and a tendency to return to said normal configuration when deformed therefrom,
and said holding means arranged in said channel with a configuration deformed from said normal configuration and the force resulting from said holding means tending to return to said normal configuration being applied against said terminal lead portions and wedging said terminal lead portions in said channel.

2. The combination of claim 1 wherein said terminal lead portions are in engagement with a wall of said channel and said holding means wedges said terminal lead portions against said wall and urges said terminal lead portions away from each other.

3. The combination of claim 1 wherein said channel is elongated including opposed walls and an inner wall extending between said opposed walls and said deformed configuration is generally tubular with said hold holding means tending to expand radially outwardly in returning to normal configuration.

4. The combination of calim 3 wherein said opposed walls are part of adjacent pole members of said dynamoelectric machine and said channel is a space between said adjacent pole members,
each of said first and second windings coiled around a respective one of said pole members with portions of said first and second windings disposed in said channel,
said terminal lead portions extending along their respective winding portions,
and said holding means comprising an elongated member having a spiral configruation about its longitudinal axis in said channel and tending to expand radially outwardly in returning to said normal configuration and wedging said terminal lead portions in said channel.

5. The combination of claim 4 wherein said terminal lead portions also engage said inner wall and said holding means is held against expansion to its normal position by said terminal lead portions and wedges said terminal lead portions against said inner wall and coil portions.

6. The combination of claim 4 wherein said holding means and terminal lead portions are engaged along the axial length of said holding means and said holding means exerts a predetermined wedging force in accordance with its axial length.

7. In combination,
means defining a channel having opposed portions,
first and second relatively spaced electrical leads in said passage,
and a holding member characterized by having a normal configuration and a tendency to return to said normal configuration when deformed therefrom, said holding member disposed in said channel between said leads with a configuration deformed from said normal configuration and the force exerted by said holding member in tending to return to said normal configuration being applied to urge said electrical leads away from each other toward said opposed channel portions.

8. The combination of claim 7 wherein
said holding member is positioned in said channel with an arcuate configuration and tends to expand radially outwardly,
and said first and second leads engaging peripherally spaced points on said holding member and together with said opposed portions preventing return of said holding member to said normal configuration.

9. The combination of claim 8 wherein:
said holding member is generally elongated having longitudinal engagement with said first and second leads,
and wherein said holding member also has a spiral configuration about its longitudinal axis and tends to expand radially outward to thereby wedge said first and second leads in position.

References Cited

UNITED STATES PATENTS

| | | | |
|---|---|---|---|
| 1,995,726 | 3/1935 | Warren | 310—71 |
| 3,014,140 | 12/1961 | Tupper | 310—71 |
| 3,293,463 | 12/1966 | Church | 310—71 |
| 3,309,447 | 2/1967 | Lindt | 310—71 |
| 3,393,335 | 7/1968 | Pletenik | 310—214 |

J D MILLER, *Primary Examiner.*

U.S. Cl. X.R.

310—214; 336—192